United States Patent [19]

Schimanek

[11] Patent Number: 4,861,247
[45] Date of Patent: Aug. 29, 1989

[54] EXPANDABLE RING FOR SEALING AN ENVELOPE AGAINST THE BEAD OF A TIRE TO BE RETREADED

[76] Inventor: Karl Schimanek, Baumackerstr. 24, Zurich CH 8050, Switzerland

[21] Appl. No.: 201,119
[22] PCT Filed: Aug. 18, 1987
[86] PCT No.: PCT/EP87/00459
   § 371 Date: Jun. 21, 1988
   § 102(e) Date: Jun. 21, 1988
[87] PCT Pub. No.: WO88/01228
   PCT Pub. Date: Feb. 25, 1988

[30] Foreign Application Priority Data

Aug. 23, 1986 [EP] European Pat. Off. ........ 86111707.5

[51] Int. Cl.⁴ ................... B29C 33/00; B29C 35/00
[52] U.S. Cl. ................... 425/11; 156/394.1; 156/909; 425/17; 425/28.1; 425/58
[58] Field of Search ........... 156/96, 94, 394.1, 909; 425/11, 17, 28.1, 58, 14, 26, 56

[56] References Cited

U.S. PATENT DOCUMENTS

| | | | |
|---|---|---|---|
| 2,697,853 | 12/1954 | Smyser | 425/17 |
| 2,700,795 | 2/1955 | Kraft | 425/58 |
| 2,817,877 | 12/1957 | Fannen | 425/58 |
| 2,988,750 | 6/1961 | Dennis et al. | 425/17 |
| 3,227,251 | 1/1966 | Ross | 425/17 |
| 4,634,357 | 1/1987 | Brewer et al. | 425/36 |

FOREIGN PATENT DOCUMENTS

| | | |
|---|---|---|
| 2940314 | 4/1980 | Fed. Rep. of Germany . |
| 2319483 | 8/1975 | France . |
| 1557723 | 12/1979 | United Kingdom . |
| 2032858 | 5/1980 | United Kingdom . |

OTHER PUBLICATIONS

Bandag's, "Advanced Radial Curing System", (The ARC TM System), 2 pages, no date given.

Primary Examiner—Willard Hoag
Attorney, Agent, or Firm—Banner, Birch, McKie and Beckett

[57] ABSTRACT

A spreadable ring for sealing an envelope at the bead of the tire to be retreaded during the pressure and heat treatment in an autoclave. The ring is spread with the aid of cut-outs (a lap joint) or by forming the ends on both sides of the opened section into a tongue-in-groove joint. In both cases a joint is generated which runs in the circumferential direction. Depending on the bead shape the sealing surface is cylindrical or tapered whereby lateral end stops or rims facilitate the positioning. The spreading is accomplished manually by the inherent tensioning force of the ring or with the aid of tensioning cylinders.

30 Claims, 3 Drawing Sheets

EXPANDABLE RING FOR SEALING AN ENVELOPE AGAINST THE BEAD OF A TIRE TO BE RETREADED

The invention concerns an expandable ring for sealing an envelope against the bead of a tire to be retreaded during the pressure and heat application in an autoclave.

A corresponding ring is for instance known from the German Offenlegungsschrift 29 40 314. The spreading is carried out by inflating a tube like rubber ring which is supported on the inside by a metal ring. These known rings have failed to achieve a practical relevance. Firstly, the longevity of the inflatable rubber chambers is too small, secondly, the form stability leaves something to be desired since, when inflated, not only the side facing the bead is increased but also the remaining rubber walls of the ring, fabricated from rubber, are blown so that the ring very easily jumps off the beads. Further, in spite of the adaption by inflating, the big tolerances as to the diameter of the tires of a certain size can hardly be coped with.

It is the object of the invention to improve a ring of the mentioned kind so that in spite of the spreadability a safe and stable sealing of an envelope against the bead of a tire to be retreaded is possible and also big diameter tolerances can be managed.

For fulfilling this object the invention proposes that the ring has overlapping end portions and consists of a ridgid elastic material such as metal, hard plastics or fiber reinforced plastics and that the opened section has at least one joint running in the circumferential direction within an overlapping section.

In the most humble case the overlapping end portions having interfitted rebbeted ends or lap joints adjacent each other on both sides of the end portions. There is a more or less strong overlapping section which depends on the spreading. The overlapping is to be chosen so that a joint of approximately 15 mm remains even when used with the biggest tire bead diameters.

Especially for small tire sizes the ring may have an expansion tension which is sufficient to automatically achieve the sealing just by releasing the ring after a manual compression onto a shrinked diameter, provided that the ring was positioned correctly into the bead and that the ring presses the envelope everywhere against the bead.

The handling is strongly faciliated when a spread clamp is used which guarantees in one end position the sealing spread and in the other end position the maximum shrinkage of the ring.

With a ring completed in this kind the following steps are carried out for achieving a sealing. After the application of the envelope onto the green tire to be retreaded a ring in accordance with the invention is placed from outside into the circular bead opening whereby the projecting rim sections of the envelope are automatically laid onto the beads. The inserting of the ring is continued so far until it is nearly completely plunged into the bead opening. During this step a circumferential lip facilitates the positioning which is provided on the ring. Afterwards, the tensioning lever of the spread clamp is swivelled so that the ring grows. Possible bead tolerances are compensated in that the spreading link of the spread clamp is resiliently mounted. If correspondingly designed, the tensioning lever of the spread clamp falls into an overcenter position in the maximum spreading position so that no separate locking is necessary.

The explained handling is still facilitated if a handle is fixed on the inside of the ring which is arranged on the opposite side of the tensioning lever of the spreading clamp in its maximum shrinkage position. In this way the ring may be diagonally grabbed and placed into the bead whereby the spreading can be accomplished immediately after the inserting by pivoting the tensioning lever. During this step, more or less in a natural way, the grip from the inserting of the ring into the bead opening until the end of the pivotal movement for the spreading is not released.

Especially with very big rings, for instance for so-called EM-tires, the own stability of the ring is so big that a manual spreading cannot be asked from a person using the ring. Then motoric tensioning means have to be applied like for instance a pneumatic cylinder which is not a component of the ring but which is only used and positioned for the spreading and shrinking. As to this embodiment the invention proposes that the spreading clamp is a toggle lever, the middle joint of which falls into an overcenter position in the maximum spreading position, and that a form locking coupling for the temporary inserting of a pneumatic or hydraulic tensioning cylinder or an electrically driven tensioning spindle is mounted to the middle joint and at the opposed position of the ring. During the following description of the figures of the drawing an embodiment of a corresponding coupling is explained by giving an example only.

It is especially useful to provide the each portions of the ring with two joints, namely to form one end fork-like and the other end tongue-like whereby a guide for the ring is created so that it is prevented from taking the shape of a screw line. The sealing effect is thus enhanced.

As to the bead form there are two principal forms on the market, namely the normal tire in which the bead surface is almost cylindrical or slightly tapered with an angle of up to 5° or so-called steep shoulder tires on which the bead surface runs under an angle of 15° compared to the center axis of the tire. While for the normal tires substantially cylindrical sealing faces are used on the ring in accordance with the invention, the sealing surface for the steep shoulder tires are correspondingly adapted; they run under an identical angle compared to the middle axis of the ring.

Especially the steep shoulder tires have large diameter tolerances as to the bead section so that very often the normal spreading of the ring in accordance with the invention is insufficient. For these cases a development is proposed in which each ring is provided with one or two further sealing surfaces having an outwardly increasing diameter and on which a counter-inclined land is positioned between adjacent sealing surfaces which prevents the ring from being pressed out along the slope of the bead surface. A corresponding land may of course also be formed on a ring in accordance with the invention having only one sealing surface for a steep shoulder tire. Especially a ring having several sealing surfaces should be made from an aluminium alloy or from plastics such as hard PVC or the like since otherwise the weight would compromise the handling.

Hereinafter embodiments of the invention which are shown in the drawing, are explained in detail; in the drawing show:

Figure 1:
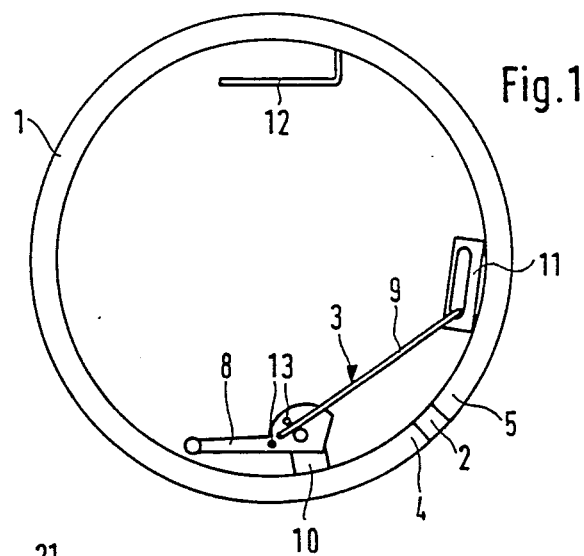
FIG. 1 is a side view of a ring in accordance with the invention for relatively small diameters.

In FIG. 1 the side view of a ring 1 in accordance with the invention is shown which is used for small to middle tire sizes. The ring 1 consists of metal, especially of a light metal alloy or of plastics and is spreadable and shrinkable due to an exandable section 2. The end portions 4 and 5 on both sides of the opened section can be moved one against the other with the aid of a spread clamp 3 so that the ring 1 may be inserted into the bead opening of a tire in the shrinkage position and enlarged in this position.

Therefore a manually actuated tensioning lever 8 as well as a spreading link 9 are provided which are held by a plinth 10 respectively by a spring block 11 at the end portions 4 and 5. In FIG. 1 the maximum shrinkage position is shown in which the ring 1 is inserted into the bead opening of a tire to be retreaded and provided with an envelope. By pivoting the tensioning lever 8 around approximately 180°, the spreading link 9 is laterally displaced until the outer sealing surface 20 (see FIG. 2) of the ring 1 is placed against the bead (see also FIG. 6).

A then not used spreading potential of the spreading link 9 is compensated by an elastic plunging of the counter-bearing in the spring block 11 so that the pivotal movement of the tensioning lever 8 into the spreading position is possible almost independently from the current bead tolerance.

In the maximum shrinkage position—that is the shown position in FIG. 1—a handle 12 is positioned on the opposite side of the tensioning lever 8, and the ring 1 is grabbed at the tensioning lever 8 and at this handle 12 and placed into the bead opening. After the inserting, spreading is carried out, normally without releasing the grip on the tensioning lever 8 which is very time-effective.

In the embodiment of FIG. 1 the spreading lever is formed into a loop, the side of which facing the tensioning lever 8 consists of two inwardly bent ends. These can be placed at will into a pair of holes 13 positioned on the tensioning lever 8 whereby the tensioning amount respectively the spreading amount can be adjusted. In this way tire tolerances can be very easily compensated.

Figure 2:
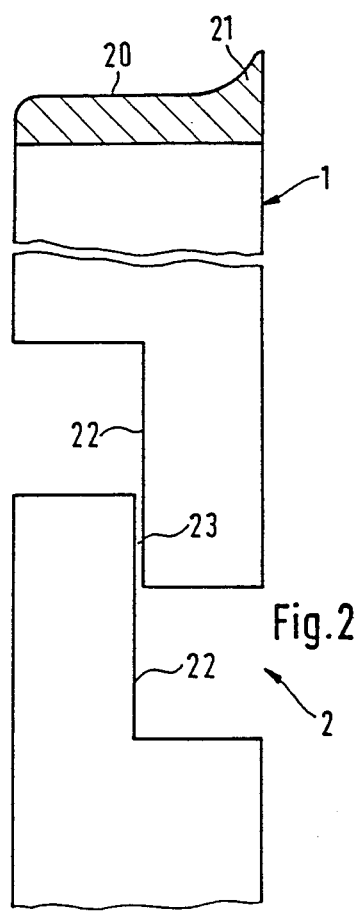
FIG. 2 is a part of a cross-sectional view of the ring according to FIG. 1.

From FIG. 2 may be taken that the sealing surface 20 of the ring 1 is substantially cylindrical and that at the axially outer part lip 21 is formed which prevents the ring 1 from being pushed through the bead opening. The side of the ring 1 opposite of the lip 21 curves gently into the sealing surface in order to prevent damage and to facilitate the inserting of the ring 1 into the bead opening.

In the area of the exandable section 2 each end portion 4 and 5 carries interfitting lap joints or rubber joint 22 which produce in the middle an overlapping tongue and step joint 23. Contrary to the shown situation the joint 23 should be closed so that at this place the sealing of the envelope to the tire bead is not too bad. The shown situation indicates that the given gap of a joint 23 can be used without detrimental effects.

Figure 3:
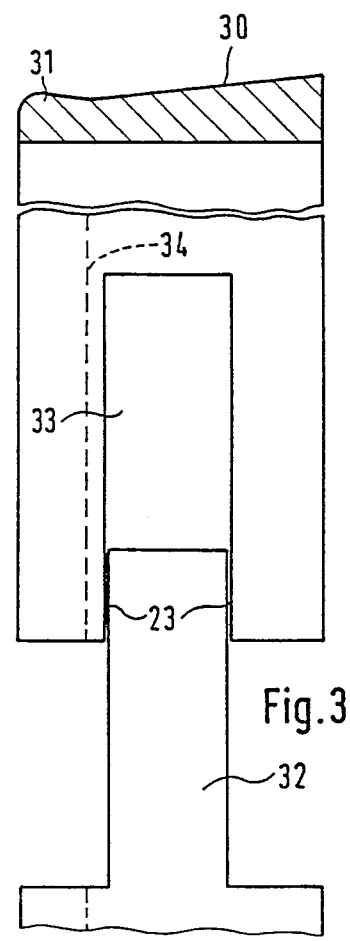
FIG. 3 is a view according to FIG. 2 of a further embodiment of a ring according to the invention for a steep shoulder tire.

In FIG. 3 a ring according to the invention is shown which is destined for so-called steep shoulder tires in which the sealing surface 30 runs under an angle of approximately 15° to the middle axis of the ring. In order to prevent a slipping of the ring out of a tapered bead opening, a land 31 is formed at the axially inner edge of the ring which has a counter-inclined slope. Again, the axially edge is rounded in order to prevent damage and to facilitate the inserting of the ring into the bead opening.

In this embodiment the overlapping section is formed by a fork on the one hand having a notch 33 and by a tongue 32 on the other hand so that there are two joints 23. In this way the sealing is enhanced—there is a labyrinth seal effect in each joint 23 in case of a certain leakage; further a gap in the joint is prevented by the guide within the notch 33. It is clearly visible that the border line 34 between the sealing surface 30 and the rim 31 runs outside of the joints 23.

Figures 4, 5:
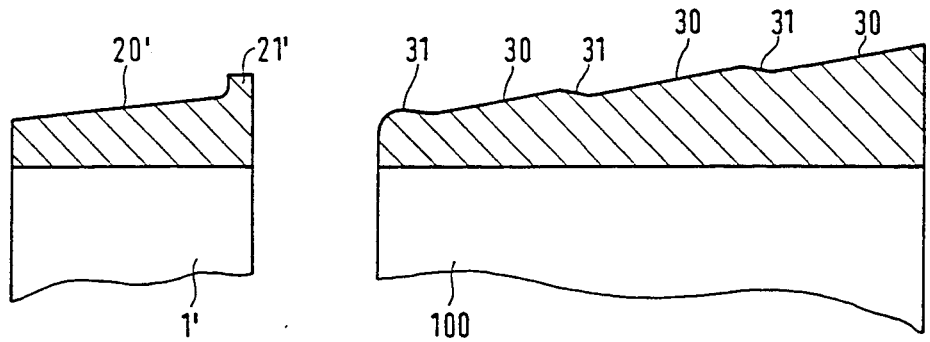
FIG. 4 is a cross-sectional view through a ring for a solid rubber tire.
FIG. 5 is a cross-sectional view through a ring for a steep shoulder tire with several sealing surfaces one beside the other for compensating strong variations in bead diameters.

In FIG. 4 a ring form is shown which is used for solid rubber tires. Due to the used profile an inner lip comparable to lip 31 according to the embodiment of FIG. 3 is not necessary. Only at the axially outer part of the sealing surface 20' a lip 21 is provided which prevents a too deep inserting of the ring 1' into the opening of the solid rubber tire.

The embodiment according to FIG. 5 is, in principle, a tripling of the ring according to FIG. 3 so that on the outside of the ring 100 three sealing surfaces 30 are arranged, one beside the other, which have an increasing diameter to the outside.

Among the steep shoulder tires there are considerable deviations as to the diameter in the bead section, there are diameter deviations of up to 12 to 15 mm. These tolerances cannot be covered with the normal spreading movements so that a double or, as shown in FIG. 5, a triple sealing surface is necessary. It is a matter of course, that a fork-like section and a tongue-like section are provided per sealing surface in order to achieve a satisfactory sealing in the area of the expandable section (not shown) since otherwise only one sealing surface would be sufficiently supported in the area of the open section.

The ring 100 in accordance with FIG. 5 is used in the usual way, that means, it is inserted in the maximum shrinkage position into the bead opening and then spread. If the resistance at the tensioning lever is too small and the overcenter position due to the lacking resistance cannot be sensed, the ring is newly brought into the maximum shrinkage position and pushed one step further into the bead opening so that the middle or even the outer sealing section 30 is used. After the spreading of the ring 100 the same conditions are achieved compared to ring 1.

Figure 6:
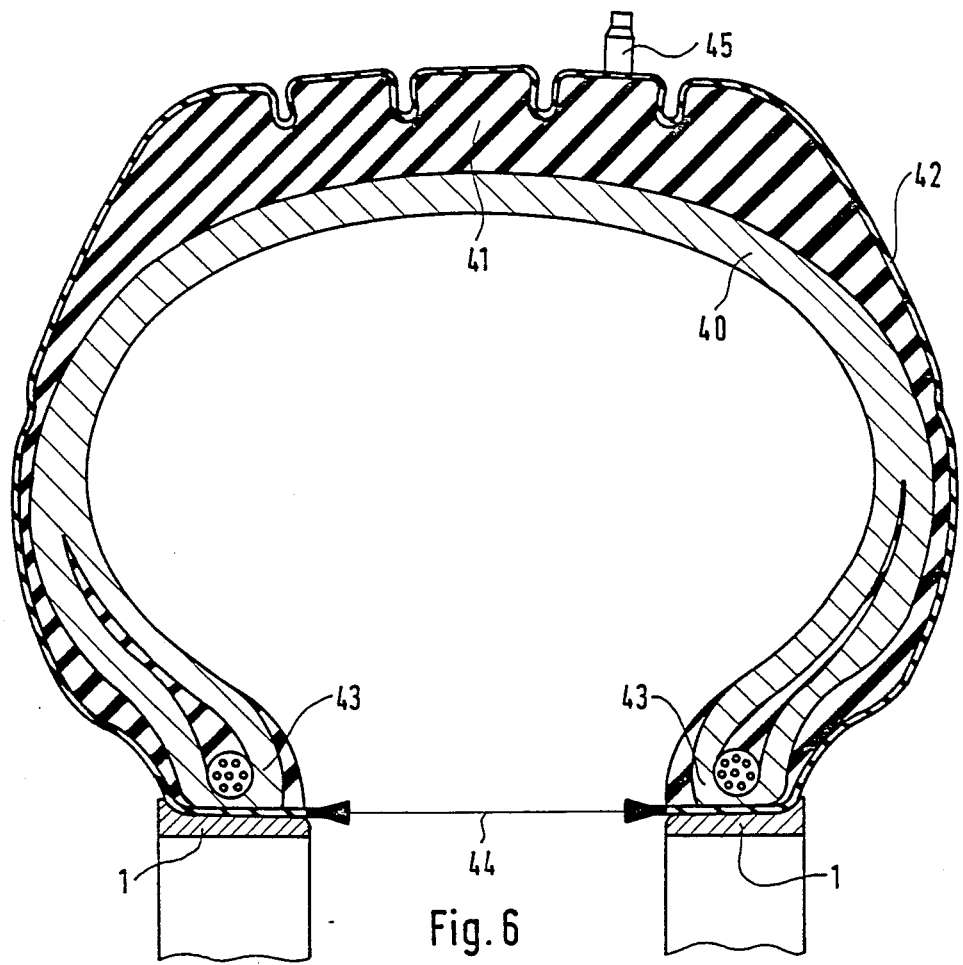
FIG. 6 is a cross-sectional view through a green tire with an applied envelope being sealed at the beads with the aid of rings in accordance with the invention.

FIG. 6 shows that two rings 1 are used for each green tire and in which way the mounting is accomplished.

On a buffed carcasse 40 a tread 41 is applied with the aid of a not shown bonding rubber layer and this unit is covered by an envelope 42. The envelope is a torus being open on the inside and covers the built up consisting of the carcass 40, the bonding rubber and the tread 41 and reaches over the lateral beads 43. By inserting the rings 1 in the maximum shrinkage position, the sections projecting the beads 43 are laid against the bead surfaces and bent to the inside of the tire. The elastic envelope 42 allows a corresponding deformation. By spreading the rings 1 the tight contact of the envelope 42 to the bead surfaces is achieved in the sealing areas 44 so that the space between the envelope 42 and the tire build up can be put under under-pressure via a valve 45.

The under-pressure guarantees that the tread 41 is pressed everywhere against the carcass 40 even if the bonding power of the bonding rubber decreases during the pressure and heat treatment. Normally, the autoclave is operated with a so-called pressure difference system; this is a method in which between the inside of the envelope 42 and the outside a pressure difference of approximately 1 bar is upheld. The reasons for this method are irrelevant for the understanding of this invention.

Figure 7:
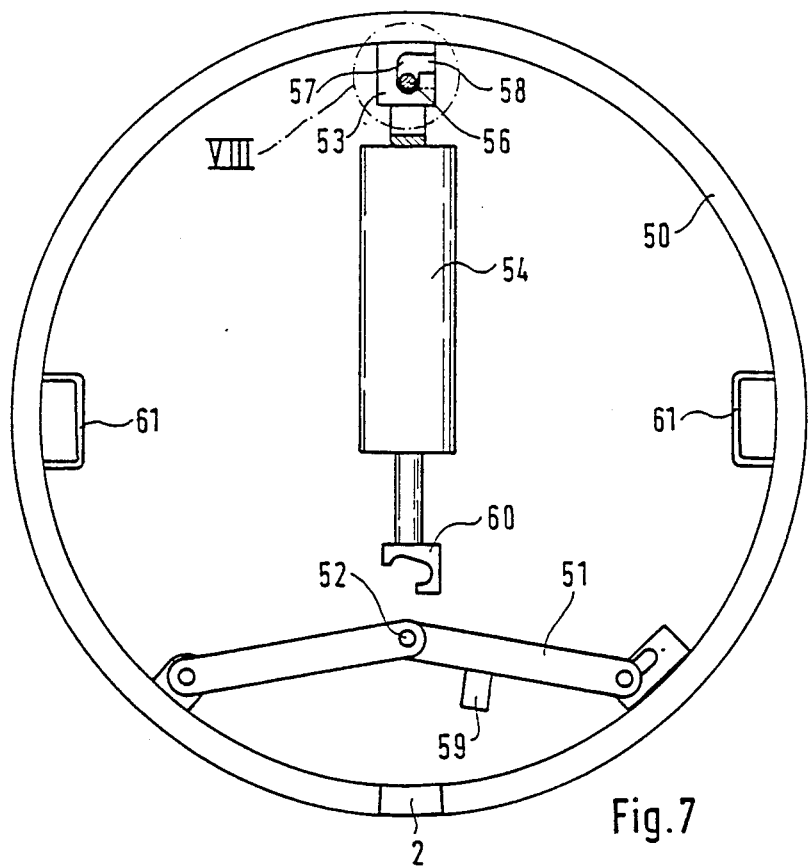
FIG. 7 is a view according to FIG. 1 of a further embodiment especially for big tires.
Figure 8:
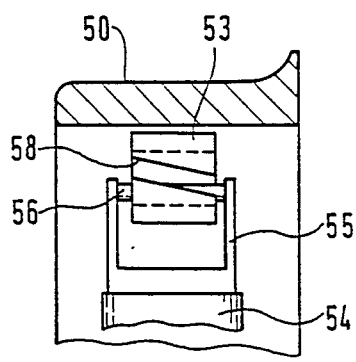
FIG. 8 is a cross-sectional view of the area encircled in dotted lines in FIG. 7.

In FIGS. 7 and 8 an embodiment for a ring according to the invention is shown which is provided for the sealing of the envelope against very big tires, for instance EM-tires. On both sides of the expandable section 2 of the ring 50 there are counter-foundations for a toggle lever 51 one of which is again resiliently supported compared to the ring 50. The toggle lever 51 consists of totally four levers. Over the two visible levers there are two identical levers under the screen plane. Both lever pairs are pivotally mounted with the aid of a middle bolt 52.

On the opposite side of the ring 50 there is plinth 53 and between this plinth 53 and the middle bolt 52 a pneumatically driven tensioning cylinder 54 may be positioned with the aid of which the spreading of the ring 50 and also the shrinking onto the mininum diameter can be accomplished. The tensioning cylinder 54 is only positioned by form lock and temporarily to the ring 50 so that it can be removed for the time of the ring in the autoclave during the vulcanization of the tire to be retreaded. For the handling there are lateral handles 61, if necessary, the ring is lifted and positioned by a chain lift.

The plinth 53 is provided with an oblong hole 57 in the moving direction of the tensioning cylinder 54 which is accessible by a lateral inclined opening of admission 58. The tensioning cylinder carries on this side a fork 55 (FIG. 8) as well as a bolt 56 the diameter of which is so chosen that it passes through the opening of the admission 58 with considerable play. At the lower end of the piston rod of the tensioning cylinder 54 there is a kind of bracket 60 which allows not only a pulling force onto the middle bolt 52 but also a pushing force whereby then the middle bolt makes a contact either at the right side or at the left side of the support surface on the bracket 60.

It is assumed that the ring 50 is stored in a stand or is placed against a wall or even hung up in a lift. The tensioning cylinder is now threaded through the opening of admission 58 by a person standing in front of the ring 50 and hung into the oblong hole 57. To accomplish this coupling the tensioning cylinder has to be positioned slightly inclined which is, however, the natural position of offering up the tensioning cylinder when it is approached to the ring 50. After the coupling the tensioning cylinder is guided by one hand and with the other hand stretched by activating a valve (not shown) so that the bracket 60 gets into contact with the middle bolt 52 of the toggle lever 51. Then the tensioning cylinder 54 is shortened so that the ring is in its maximum shrinkage position. In this shape the ring 50 is placed into the bead opening of the tire having already an envelope.

After the positioning of the ring 50 within the corresponding bead opening the tensioning cylinder 54 is stretched by switching said valve whereby the bracket 60 jumps from the pulling contact into the pushing contact. The spreading is now carried out until the overcenter position is reached in which a support 59 sits on the inside of the ring 50. It serves for adjusting the overcenter position and for preventing a too far overcenter movement of the toggle lever 51. In the overcenter position the toggle lever 51 is completely stable so that the tensioning cylinder 54 can be removed without any danger. After a slight or complete withdrawal of the piston rod the tensioning cylinder is removed again by a slight tilting movement and by lifting it out of the plinth 53. It can now be used for the corresponding ring 50 for the other bead or for every other tensioning job within the corresponding vulcanizing shop.

I claim:

1. An expandable ring assembly for sealing an envelope against the bead of the ordinary tire to be retreaded or repaired in an autoclave by pressure and heat treatment, said expandable ring assembly comprising:
    a one-piece ring of substantially rigid, elastic material, said ring having overlapping end portions which are movable relative to each other to spread said ring to thereby increase the diameter thereof during a sealing action and to shrink said ring and to thereby decrease the diameter thereof for removing said ring after autoclave pressure and heat treatment, said ring having a generally cylindrical sealing surface and an axially outer part, with a single, radially extending circumferential lip at said axially outer part; said end portions being overlapped in a tongue and stepped configuration as viewed perpendicularly to the ring central axis; and
    a spread clamp means for moving said end portions towards each other.

2. The expandable ring assembly of claim 1 further comprising a pair of opposed handles on the inside of said ring.

3. The expandable ring assembly of claim 1 wherein said overlapping end portions form a lap joint.

4. The expandable ring assembly of claim 1 wherein said overlapping end portions form a tongue-in-groove joint.

5. The expandable ring assembly of claim 1 wherein said circumferential lip has a surface thereof curving gently into said cylindrical sealing surface.

6. The expandable ring assembly of claim 1 wherein said overlapping end portions form an arcuate sliding joint.

7. The expandable ring assembly of claim 1 said rigid, elastic material is selected from the group of metals, hard plastics, and fiber reinforced plastics.

8. The expandable ring assembly of claim of claim 1 wherein said spread clamp means comprises a spread clamp having an over-center action in the spread position.

9. The expandable ring assembly of claim 1 wherein said spread clamp means comprises at least one resiliently-supported spreading link.

10. The expandable ring assembly of claim 9 wherein said tensioning lever has at least two pairs of holes, and said spreading link has a bow-like shape with inwardly curved ends for insertion into said holes.

11. The expandable ring assembly of claim 9 wherein said spread clamp means comprises a tensioning lever, and said spreading link is pivotally attached to said tensioning lever.

12. The expandable ring assembly of claim 11 further comprising a handle positioned at the opposite side of said ring as said tensioning lever when said spread clamp means is in a compressed position.

13. The expandable ring assembly of claim 12 wherein said tensioning lever has at least two pairs of holes, and said spreading link has a bow-like shape with inwardly curved ends for insertion into said holes.

14. An expandable ring assembly for sealing an envelope against the bead of a steep shoulder tire to be retreaded or repaired in an autoclave by pressure and heat treatment, said expandable ring assembly comprising:

a ring of substantially rigid, elastic material, said ring having overlapping end portions which are movable relative to each other to spread said ring to thereby increase the diameter thereof during a sealing action and to shrink said ring and to thereby decrease the diameter thereof for removing said ring after autoclave pressure and heat treatment, said ring having a circumferential sealing surface, said sealing surface having an edge, said ring having a circumferential land adjacent said edge, said sealing surface being complementary to the bead surface of a steep shoulder tire, and said end portions being overlapped in a tongue and stepped configuration as viewed perpendicularly to the ring central axis; and a spread clamp means for moving said end portions towards each other.

15. The expandable ring assembly of claim 14 further comprising a pair of opposed handles on the inside of said ring.

16. The expandable ring assembly of claim 14 wherein said overlapping end portions form a lap joint.

17. The expandable ring assembly of claim 14 wherein said overlapping end portions form an arcuate sliding joint.

18. The expandable ring assembly of claim 14 wherein said rigid elastic material is selected from the group of metals, hard plastics, and fiber reinforced plastics.

19. The expandable ring assembly of claim 14 wherein said spread clamp means comprises a spread clamp having an over-center action in the spread position.

20. The expandable ring assembly of claim 14 wherein said ring has another sealing surface and another land for handling extreme bead tolerances.

21. The expandable ring assembly of claim 20 wherein said sealing surfaces have increasingly greater diameters.

22. The expandable ring assembly of claim 14 wherein said spread clamp means comprises a toggle lever.

23. The expandable ring assembly of claim 22 wherein said toggle lever has a middle joint which falls into an over-center position in the maximum spread position, and said spread clamp means comprises a coupling at said middle joint and at an opposite position on said ring.

24. The expandable ring assembly of claim 23 further comprising a tensioning mechanism installed at said coupling.

25. The expandable ring assembly of claim 24 wherein said tensioning mechanism is selected from the group of pneumatically-actuated tensioning cylinders, hydraulically-actuated tensioning cylinders, and electrically-driven tensioning spindles.

26. The expandable ring assembly of claim 14 wherein said spread clamp means comprises at least one resiliently-supported spreading link.

27. The expandable ring assembly of claim 26 wherein said spread clamp means comprises a tensioning lever, and said spreading link is pivotally attached to said tensioning lever.

28. The expandable ring assembly of claim 27 wherein said tensioning lever has at least two pairs of holes, and said spreading link has a bow-like shape with inwardly curved ends for insertion into said holes.

29. The expandable ring assembly of claim 27 further comprising a handle positioned at the opposite side of said ring as said tensioning lever when said spread clamp means is in a compressed position.

30. The expandable ring assembly of claim 29 wherein said tensioning lever has at least two pairs of holes, and said spreading link has a bow-like shape with inwardly curved ends for insertion into said holes.

* * * * *